Patented July 10, 1945

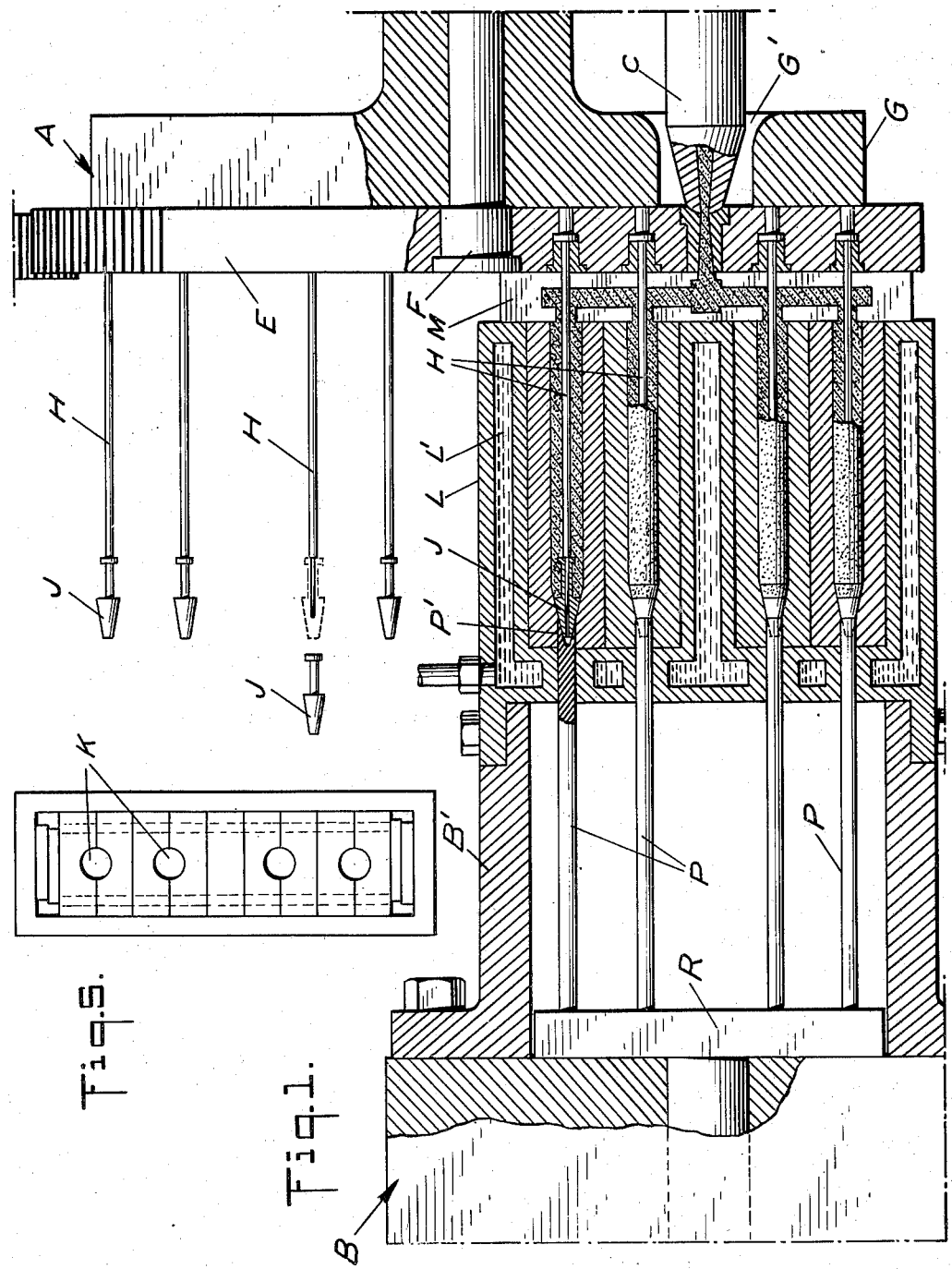

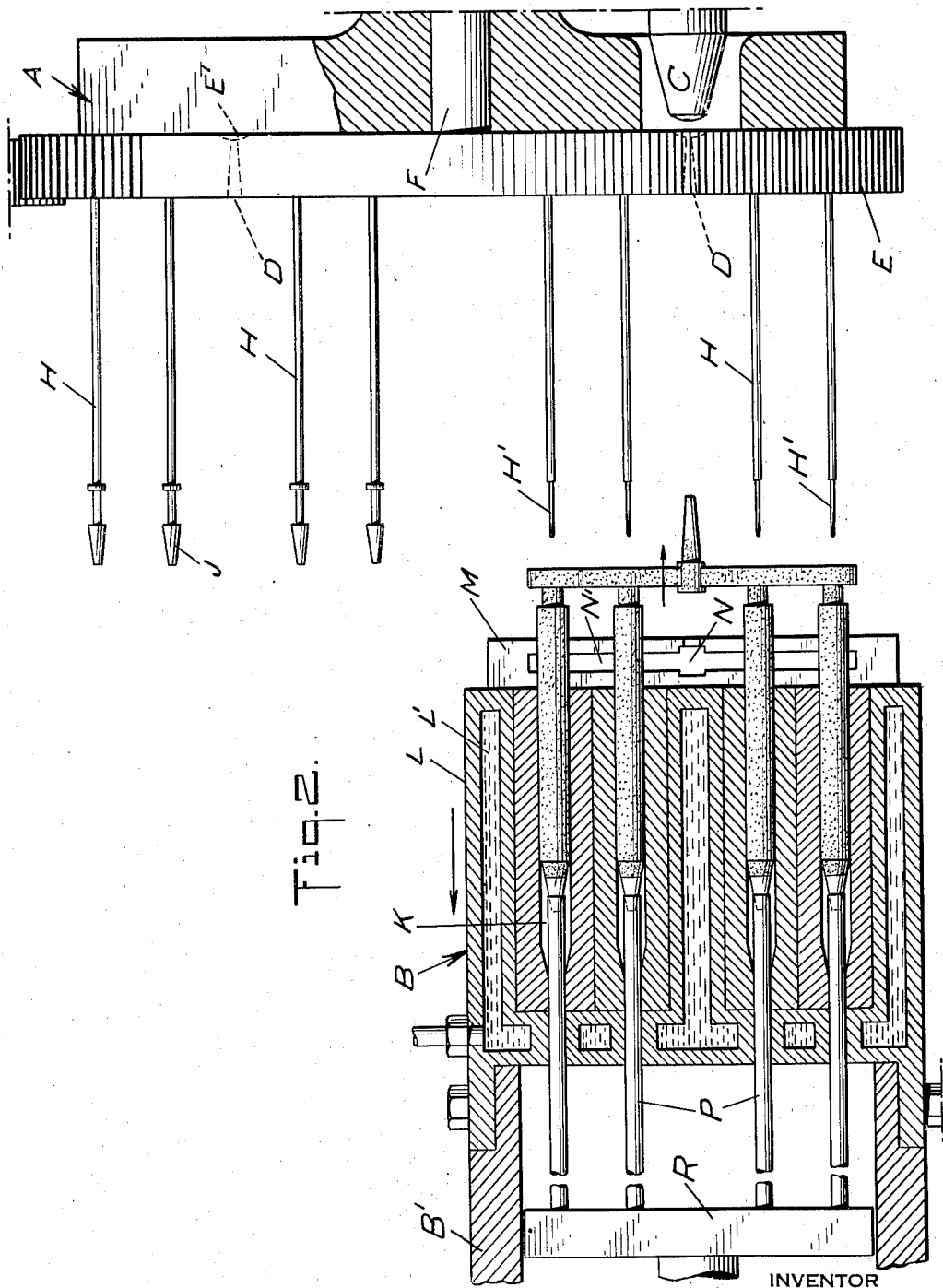

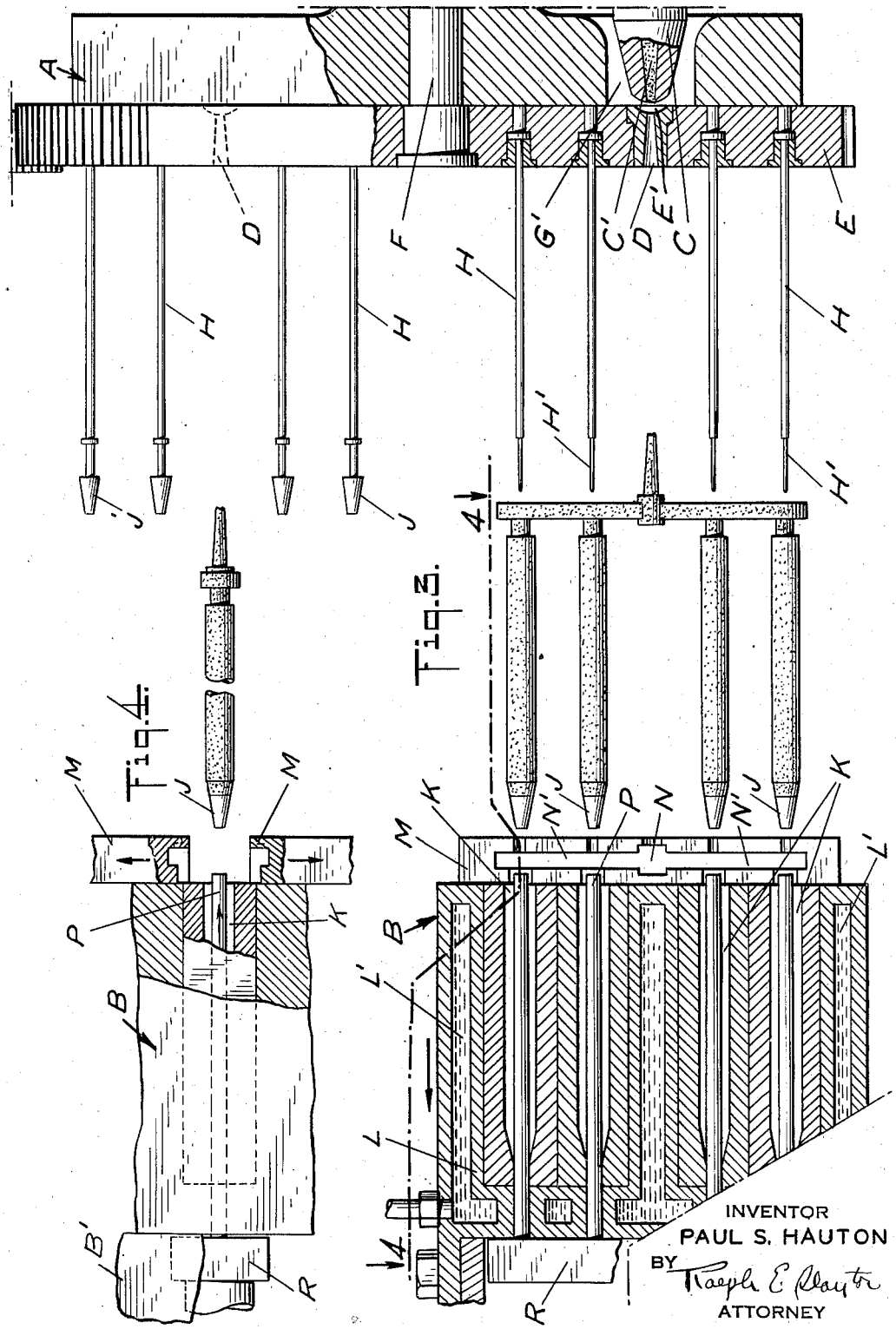

2,380,042

UNITED STATES PATENT OFFICE 2,380,042

APPARATUS FOR FORMING PLASTIC OBJECTS

Paul S. Hauton, Atlanta, Ga., assignor to Scripto Manufacturing Company, Atlanta, Ga., a corporation of Georgia Application December 30, 1941, Serial No. 424,868

9 Claims. (Cl. 18—30)

This invention relates to molded objects and their means of production and has more particular reference to the production of molded objects more especially long slender tubular objects from a thermoplastic mass.

One of the objects of the invention is to expeditiously and efficiently produce such molded objects.

Another object of the invention is to produce such objects without necessarily parting the mold walls to remove the object.

Another object of the invention is to facilitate maintenance of proper temperature of the mold parts.

Other and further objects will be pointed out or will become apparent to one skilled in the art as the description proceeds.

Comprehensively stated the invention comprises the cyclic production of tubular molded objects from a thermoplastic mass.

More specifically stated the invention comprises the injection of a thermoplastic mass into cooperating mold parts to form a long slender tubular molded article, withdrawing the molded article from the mold without parting the mold walls, and using some of the mold parts alternately to facilitate maintenance of a "working" temperature.

While one embodiment of this invention is illustrated in the accompanying drawings, it is to be understood that such embodiment merely serves as an illustration of the underlying principles of the invention so that it may be readily comprehended by those skilled in the art, and is not intended as limiting the invention to the specific details disclosed therein.

In said drawings:

Fig. 1 is a side elevation of the mechanism used in carrying out the invention partly in section and partly fragmentary.

Fig. 2 is a view similar to that shown in Fig. 1 showing the mechanism in an intermediate position.

Fig. 3 is a view similar to that shown in Figs. 1 and 2 showing a group of mold articles completely ejected.

Fig. 4 is a section of Fig. 3 on the line 4—4 and

Fig. 5 is a constructional modification of some of the elements.

Continuing now by way of a detailed description the mechanism used in effecting the production of the molded object comprises, generally speaking, two relatively movable cooperating units. One of these units indicated generally by A in the illustrated embodiment has a limited yielding motion and the unit indicated generally by B is shown as reciprocating in a rectilinear direction. The unit A cooperates with a stationary sprue or injecting nozzle C having a tapered orifice C' narrowing at the end of the nozzle and adapted to register with a tapered opening D formed in an indexing plate E and tapering so that its narrowest part is contiguous to the end of sprue nozzle C. The restricted portion formed by these two tapers serves to facilitate the initial separation of a group of molded objects from the sprue nozzle as will become apparent hereinafter. The sprue or injecting nozzle C communicates with any suitable means (not shown) for heating a suitable thermoplastic mass and forcing it through the sprue nozzle. The plate E is rotatable about a shaft F for a purpose to be hereinafter set forth. This rotatable indexing plate is backed by the slightly yielding member G having an opening G' for the purpose of permitting the sprue nozzle to seat itself in recess E' by the slight movement of the rotatable indexing plate E and the yielding backing member or plate G when the reciprocating member B presses against the plate E in its closed position. A plurality of mandrels H for forming the axial bore of the tubular molded member are arranged in groups on the plate E so that successive groups may be brought to molding position. The mandrels H have one end secured in the plate E in any convenient manner and are arranged with their longitudinal axes parallel to each other. The illustrated embodiment of the invention is shown as adapted for the production of mechanical pencil barrels. When it is desired to produce such pencil barrel the usual metal tip J at the writing end of the pencil is inserted over the reduced free end H' of the mandrel H. This tip may be manually placed in the position as indicated in Fig. 1 if desired. When the tips J have been placed in such position the indexing plate E is rotated about its axis F so that the opening D is brought into registry with the sprue opening C'. In this position the mandrels carrying the pencil tips J are aligned with the longitudinal axes of mold openings K so that when the movable mold unit B is moved toward the relatively stationary unit A the mandrels H will enter the mold openings. These mold openings may be formed in a block. In order to facilitate the production of intricate shapes the mold parts are divided as indicated in Fig. 5.

When the die or mold member is formed from several parts the parts are locked together in any convenient manner as for instance by bolts or wedges. Since the illustrated mechanism is more especially adaptable for molding objects from thermoplastic materials and usually such thermoplastic materials must be heated to permit the mass to flow, provision is made for cooling the molds. Preferably a coolant is circulated through mold housing L. This housing has circulating openings or channels L' through which the coolant is circulated in any convenient manner as will be readily understood. In the production of the molded object illustrated, namely a pencil barrel, one end of the barrel has a special shape. In order to produce this special shape separable forming dies M are used to produce this special configuration. In order to permit withdrawing the object from its mold these dies are arranged to open at the proper time so as to permit the withdrawal of the molded object. In Fig. 4 these separable dies are shown in open position and this may be effected in any suitable manner as will be readily understood. When the movable unit is moved to molding position as shown in Fig. 1 it initially presses back the indexing plate E and its yielding backing plate so that the sprue nozzle seats itself in the recess E' and its orifice registers with the opening D in plate E. In this position of the sprue nozzle the heated thermoplastic mass may be ejected from the sprue nozzle into the opening D which in turn registers with the central distributing cavity N in the forming gates M and communicates with the group of mold openings K through the secondary communicating channels N'. The thermoplastic mass is forced through these secondary channels N' into the mold openings K in which are positioned in the closed position of the mechanism the mandrels H with the tip in place if the molded object to be produced requires such element. Because of the temperature of the thermoplastic mass the mandrels become heated and in order to cool these mandrels alternate groups are used by rotation of the indexing plate E on shaft F. In order to eject the molded object from the mold openings a plurality of ejector rods P are mounted on a plate R which is independently movable with respect to mold unit B and its supporting frame work B'. The free ends of these ejector rods P may be dished so that the end of the tip J or if desired the end of the mandrels may be seated therein during the molding operation. The seating of the mandrels in the ends of the ejecting rods furnishes support for the free end thereof and serves to accurately align the mandrel in the mold opening. On retrograde movement of the molding unit from its position shown in Fig. 1 the gates remain closed and the ejector rods P move backwardly concurrently with the molding unit so that the first effect of the retrograde movement is to break the thermoplastic material at the end of the sprue opening. As above indicated the rotatable indexing plate E and its backing plate have a slight motion with respect to the sprue nozzle so that as soon as the pressure of the movable unit B is released from the indexing plate E and its backing plate G these plates move with respect to the end of the sprue nozzle and break the thermoplastic material in the region of the sprue nozzle. The retrograde movement of the unit B together with the ejector pins is maintained until the molded article is entirely clear of the ends of the mandrels. The gates M at this point are opened so that the group of molded articles connected to each other by the thermoplastic material formed in the distributing channels may be pushed out of the molds. To effect this release the motion of the mold unit is continued while the ejector rods P remain stationary. The mandrels H because of their contact with the thermoplastic mass have become heated. In order that they may be cooled the plate E is rotated on the shaft F so that the group of mandrels used in the molding operation are moved to a position where they can cool. During this cooling operation another group of mandrels is brought to a position where they are aligned with the mold openings so that the cycle may be repeated.

In producing the molded objects from the thermoplastic mass the object which is to be secured to one end of the molded object is first placed on the group of mandrels H. With the mold unit in separated position as shown in Fig. 3 this group of mandrels is then swung to a position by rotation of plate E where the mandrels with their tips are aligned with the mold openings K. The unit B is now moved forward to a position where the mandrels are centered in the mold openings. This position of the unit B and the closed gates M brings the distributing channels communicating with the molds in the gates M to a position where they communicate with the opening D. The ejector rods P are now in position so that they contact the ends of the mandrels or the object carried on the end of mandrels H. The thermoplastic mass having been heated to the desired temperature is forced under pressure through the sprue openings C' and opening D into the separable forming dies M and solid mold opening K. As soon as the plastic material has hardened sufficiently to be ejected the unit B is backed off and the casting ejected from the mold as previously described.

It is claimed:

1. Apparatus for producing injection molded plastic articles comprising a rectilinearly reciprocating mold carrying platen, a second platen and a registering plate backed by said second platen, a mold comprising a hollow section and a mandrel, said hollow section being mounted on said reciprocating platen, and a plurality of said mandrels being mounted on said registering plate, said second platen and registering plate having a forward position in which the registering plate extends into the path of the hollow mold section adjacent the end of its movement in a closing direction, and being movable rearwardly of said forward position under pressure of said hollow mold section, said registering plate being movable also in a plane perpendicular to the direction of movement of said reciprocating platen to bring mandrels carried thereby successively into registry with the hollow mold section, an outlet nozzle from a plasticizing chamber positioned back of said registering plate with its mouth in sealed contact with said plate when the latter is pressed back by said hollow mold section, said registering plate having sprue passages therethrough individual to the successively registrable mandrels, positioned to register with said nozzle and to communicate with the hollow mold section, when the corresponding mandrel is in registry with the hollow mold section.

2. In apparatus as claimed in claim 1, a pin extending into said hollow mold section from the end thereof remote from said registering plate, supporting the free end of said mandrel when said hollow mold section and mandrel are in molding position.

3. In apparatus as claimed in claim 1, an ejector pin slidably extending into said hollow mold section through the end thereof remote from said registering plate, supporting the free end of said mandrel in precise position when said hollow mold section and mandrel are in molding position, said reciprocating platen being movable, first with said ejector pin in a direction away from said registering plate to cause withdrawal of said mandrel from the cast, and then away from said registering plate relative to said ejector pin to eject the cast.

4. Apparatus for producing injection molded plastic articles comprising a rectilinearly reciprocating mold carrying platen, a second platen and a registering plate backed by said second platen, a mold comprising a group of hollow sections and a group of cooperating mandrels, said group of hollow sections being mounted on said reciprocating platen, and a plurality of said groups of mandrels being mounted on said registering plate, said second platen and registering plate having a forward position in which the registering plate extends into the path of the group of hollow mold sections adjacent the end of its range of movement in a mold closing direction, and being movable rearwardly of said forward position under pressure of said group of hollow mold sections, said registering plate being movable also in a plane perpendicular to the direction of movement of said reciprocating platen to bring groups of mandrels carried thereby successively into registry with the hollow mold sections, an outlet nozzle from a plasticizing chamber positioned back of said registering plate with its mouth in sealed contact with said plate when the latter is pressed back by said group of hollow mold sections, said registering plate having sprue passages therethrough individual to the groups of mandrels, positioned to register with said nozzle and to communicate commonly with said hollow mold sections when the corresponding group of mandrels is in registry with the group of hollow mold sections.

5. Apparatus for producing injection molded plastic articles as claimed in claim 4, said hollow mold sections being each longitudinally divided in parallel planes, a frame transversely embracing said group of hollow mold sections, and means for applying wedging pressure between said frame and said group in a direction perpendicular to the planes of division of said hollow mold sections.

6. Apparatus for producing injection molded plastic articles such as pencil barrels including a preformed insert, comprising a rectilinearly reciprocating mold carrying platen, a second platen and a registering plate backed by said platen, a mold comprising a hollow section and a mandrel said hollow section being mounted on said reciprocating platen, and a plurality of said mandrels being mounted on said registering plate, the free ends of said mandrels being formed to receive and retain an insert, said second platen and registering plate having a forward position in which the registering plate extends into the path of the hollow mold section adjacent the end of its movement in a closing direction, and being movable rearwardly of said forward position under pressure of said hollow mold section, said registering plate being movable also in a plane perpendicular to the direction of movement of said reciprocating platen to bring mandrels carried thereby successively into registry with the hollow mold section, an outlet nozzle from a plasticizing chamber positioned back of said registering plate with its mouth in sealed contact with said plate when the latter is pressed back by said hollow mold section, said registering plate having sprue passages therethrough individual to the successively registrable mandrels, positioned to register with said nozzle and to communicate with the hollow mold section when the corresponding mandrel is in registry with the hollow mold section, an ejector pin slidably extending into said hollow mold section through the end thereof remote from said registering plate, supportingly engaging the insert when said hollow mold section and mandrel are in molding position, said reciprocating platen being movable, first with said ejector pin in a direction away from said registering plate to cause withdrawal of said mandrel from the cast, and then away from said registering plate relative to said ejector pin to eject the cast.

7. Apparatus for producing injection molded plastic articles such as pencil barrels, comprising a rectilinearly reciprocating mold carrying platen, a second platen and a registering plate backed by said second platen, a sectional mold comprising a main mold section and a complementary mold section, said main mold section comprising a group of laterally positioned hollow dies and a superposed die in contact with said hollow dies having mold chambers registering with said hollow dies and a gate passage connecting said mold chambers, said complementary section comprising a plurality of mandrels, one for each hollow die, registrable therewith and with the corresponding mold chambers in said superposed die, said mandrels being undercut in those portions which occupy the mold chambers in said superposed die, said main mold section being mounted on said reciprocating platen and a plurality of said complementary mold sections being mounted on said registering plate, said second platen and registering plate having a forward position in which the registering plate extends into the path of said main mold section adjacent the end of its range of movement in a mold closing direction, and being movable rearwardly of said forward position under pressure of said main mold section, said registering plate being movable also in a plane perpendicular to the direction of movement of said reciprocating platen to bring complementary mold sections successively into registry with the main mold section, an outlet nozzle from a plasticizing chamber positioned back of said registering plate with its mouth in sealed contact with said plate when the latter is pressed back by said main mold section, said registering plate having sprue passages therethrough individual to the complementary mold sections positioned to register with said nozzle and to communicate with the gate passage in said superposed die when the corresonding complementary mold section is in registry with the main mold section, said superposed die being separable in a vertical plane embracing the registering mandrels.

8. Apparatus for producing injection molded plastic articles such as pencil barrels, comprising a rectilinearly reciprocating mold carrying platen, a mandrel carrying platen located in the path of said rectilinearly reciprocating platen and contacted by said platen at the end of its forward movement, a sprue nozzle of a plasticizing chamber positioned back of said mandrel carrying platen the latter being formed with an injection passage therethrough, opening in alignment with said sprue nozzle, a mold member carried by said rectilinearly reciprocating platen comprising a housing fastened to said platen, a plurality of elongated mold openings in said housing, and separable forming dies mounted in slidable relation on said housing having a plurality of complementary mold openings spaced in alignment with said elongated mold openings when said forming dies are in closed position, said forming dies having channels connecting said mold openings with said injection passage when said forming dies contact said mandrel carrying platen at the end of the forward movement of said rectilinearly reciprocating platen, and a plurality of mandrels mounted on said mandrel carrying platen spaced in alignment with said mold openings so that said mandrels will be located within said mold openings when the rectilinearly reciprocating platen reaches the end of its forward movement.

9. Apparatus for producing injection molded elongated plastic articles having a reduced or under-cut section at the injection end, comprising a rectilinearly reciprocating mold carrying platen, a mandrel carrying platen located in the path of said reciprocating platen and contacted by said platen at the end of its forward movement, a sprue nozzle of a plasticizing chamber positioned back of said mandrel carrying platen, the latter being formed with an injection passage therethrough, opening in alignment with sprue nozzle, a mold member carried by said rectilinearly reciprocating platen comprising a plurality of cavity blocks each having a longitudinal bore and split into longitudinal sections, a housing in which said blocks are locked in spaced relation, thereby forming a plurality of non-parting mold openings, said housing also carrying movably mounted laterally separable forming dies having a plurality of complementary mold openings in alignment with the non-parting mold openings in said housing, said separable forming dies being made in sections with the parting lines between sections intersecting said complementary mold openings to permit lateral separation of said movable forming dies and withdrawal of the molded article from the non-parting mold openings, said forming dies having channels connecting said complementary mold openings with said injection passage when said forming dies contact said mandrel carrying platen at the end of the forward movement of said reciprocating platen, and a plurality of mandrels mounted on said mandrel carrying platen in alignment with the respective mold openings so that the mandrels will be located within said mold openings when the rectilinearly recipocating platen reaches the end of said forward movement.

PAUL S. HAUTON.